US012693115B2

(12) United States Patent (10) Patent No.: US 12,693,115 B2

Hagag Osman (45) Date of Patent: Jul. 28, 2026

(54) PROCESS AND SYSTEM FOR TRACKING GROUND MOVEMENT

(71) Applicant: TRANS-PLAN TRANSPORTATION INC., Toronto (CA)

(72) Inventor: Shady Hagag Osman, Toronto (CA)

(73) Assignee: Shady Hagag Osman, Toronto (CA)

( * ) Notice: Subject to any disclaimer, the term of this patent is extended or adjusted under 35 U.S.C. 154(b) by 261 days.

(21) Appl. No.: 18/683,719

(22) PCT Filed: Aug. 16, 2021

(86) PCT No.: PCT/CA2021/051125

§ 371 (c)(1),
(2) Date: Feb. 14, 2024

(87) PCT Pub. No.: WO2023/019339

PCT Pub. Date: Feb. 23, 2023

(65) Prior Publication Data

US 2024/0361123 A1 Oct. 31, 2024

(51) Int. Cl.
| | |
|---|---|
| *G01C 11/36* | (2006.01) |
| *B64U 20/87* | (2023.01) |
| *G06T 7/292* | (2017.01) |
| *G08G 1/01* | (2006.01) |
| *B64U 101/31* | (2023.01) |

(52) U.S. Cl.
CPC .............. *G01C 11/36* (2021.08); *B64U 20/87* (2023.01); *G06T 7/292* (2017.01); *G08G 1/012* (2013.01); *G08G 1/0133* (2013.01); *B64U 2101/31* (2023.01); *G06T 2207/10021*

(2013.01); *G06T 2207/10032* (2013.01); *G06T 2207/30236* (2013.01); *G06T 2207/30241* (2013.01)

(58) Field of Classification Search
CPC ...... G01C 11/36; G08G 1/012; G08G 1/0133; G06T 7/292; G06T 2207/10021; G06T 2207/10032; B64U 20/87
See application file for complete search history.

(56) References Cited

U.S. PATENT DOCUMENTS

| | | | | |
|---|---|---|---|---|
| 11,074,811 | B2 * | 7/2021 | Fowe | ..................... G06V 20/17 |
| 2015/0356868 | A1 | 12/2015 | Alonso | |
| 2020/0066142 | A1 | 2/2020 | Fowe et al. | |
| 2021/0108919 | A1 | 4/2021 | Blaylock et al. | |

OTHER PUBLICATIONS

Pellegrino, et al. (Simple Area Coverage by a Dynamic Set of Unmanned Aerial Vehicles), IEEE. (Year: 2020).*

(Continued)

*Primary Examiner* — Daniel G Mariam

(74) *Attorney, Agent, or Firm* — Bennett Jones LLP

(57) ABSTRACT

The present invention employs video camera-equipped, unmanned aerial vehicles (UAVs) to collect video imagery from a predefined study area on the ground, where vehicles are performing trips. The video imagery is then processed using machine vision to extract vehicle trajectory information, which is then organized and manipulated for presentation in 5 a user-facing display when required. In contrast with the state of the art data procurement technologies, the resulting data features continuity in both time and space, reflects 100% of the trips and has a significantly lower cost.

16 Claims, 4 Drawing Sheets

Video cameras on UAVs collect video imagery of vehicular movements on the ground Continuous video imagery mosaic is assembled in a computer using GPS coordinates from two or more video camera imagery files Machine vision software tracks vehicular movements within video imagery mosaic Tracking process yields vehicle trajectory files based on vehile coordinates and timestamps User display software manipulates vehicle trajectory files to present data to user

(56) References Cited

OTHER PUBLICATIONS

Coifman, et al. (Roadway traffic monitoring from an unmanned aerial vehicle). (Year: 2006).*

Acevedo, et al. (An Efficient Distributed Area Division Method for Cooperative Monitoring Applications with Multiple UAVs). (Year: 2020).*

Fatma Outay et al., "Application of unmanned aerial vehicle (UAV) in road safety, traffic and highway infrastructure management: Recent advances and challenges", Transportation Research Part A: Policy and Practice, vol. 141, 2020, pp. 116-129, ISSN 0965-8564.

* cited by examiner

Video cameras on UAVs collect video imagery
of vehicular movements on the ground

Continuous video imagery mosaic is assembled
in a computer using GPS coordinates from two
or more video camera imagery files

Machine vision software tracks vehicular
movements within video imagery mosaic

Tracking process yields vehicle trajectory files
based on vehile coordinates and timestamps

User display software manipulates vehicle
trajectory files to present data to user

Fig.1

UAV

Flight Path

Center Point 2

Polygonal Coverage Area 1

Polygonal Coverage Area 4

Center Point 7

Center Point 6

Center Point 8

Polygonal Coverage Area 5

Polygonal Coverage Area 3

Central Point

Polygonal
Coverage Area

Intermitently
Visible Portion of
the imagery

X

PROCESS AND SYSTEM FOR TRACKING GROUND MOVEMENT

FIELD OF THE INVENTION

The present invention relates to the procurement of data regarding vehicular and individual movement on the ground.

BACKGROUND OF THE INVENTION

The authorities that provide transportation infrastructure rely heavily on trip data that is procured via surveys. Both the planning of new transportation infrastructure and the management of existing infrastructure can only be done effectively once the existing transportation system charac- teristics are known. These characteristics include trip demand (i.e., volumes), the timing of such trips and their origin and destination locations.

Without knowledge of the volume, timing, composition and directional distribution of trips-whether performed by private motorized vehicles, bicycles or transit—it is impos- sible to analyze the operation, safety and maintenance needs of the transportation infrastructure which performance is crucial for the safe and effective functioning of cities. None of the recent developments in terms of connected/automated vehicles, internet commerce and urban planning have elimi- nated the dire need for trip data information that is complete and reliable, because as long as people and goods need to move, information of their trip characteristics will be needed for providing the required transportation infrastructure (roadways, transit stations, parking facilities, etc.).

The studies performed for assessing transportation infra- structure needs are typically focused on a specified study area (e.g., an urban road corridor with multiple intersections) and a specified study time (e.g., the morning peak interval of a weekday) typically referred to as the survey period. These studies rely on data input from surveys, where such surveys identify the trips performed within that given study area during that specific survey period. The cost of data surveys is a major component of the budget required by transporta- tion agencies to perform their duties. Under the current state of the art, the agencies responsible for infrastructure plan- ning and administration must rely on survey data sets that are fraught with discontinuity. The available data survey technologies only manage to obtain data for a fraction of the total number of trips that actually are carried out during a given survey period inside the limits of a given study area. This incomplete sample is made worse by the fact that the resulting trip data is discontinuous both in time and space. In short, the trip data obtainable using the state of the art survey technologies present one or more of the following limitations:

The dataset is incomplete (it does not document 100% of the trips performed);

The dataset is discontinuous in space (data collected within multiple separated segments of the study area);

The dataset is discontinuous in time (data is not collected across the whole study area simultaneously and for the duration of the survey period):

Various technologies are available in the state of the art for surveying trip movement of vehicles on the ground. The traditional means for obtaining vehicle turning movement data at roadway intersections is field surveys, where vehicles are counted, classified according to mode (auto, truck, transit, pedestrian and bicycle) and allocated to specific movements when passing a road intersection. Nowadays real-time surveys with people counting traffic live are rare— the data is more often collected by video cameras that are temporarily attached to urban furniture, with the actual count and classification based on processing the recorded video imagery later on.

Intersection-based counts at ground level have well known, significant limitations. Although these intersection counts normally succeed in counting 100% of the vehicles that move through the intersection during the counting period, there is no continuity in time and space-no practical means to track the movement of individual vehicles through a series of consecutive intersections along their broader trip routes. The typical traffic volume diagrams used to analyze wider study areas, transit corridors and other similar infra- structure must therefore rely on multiple, isolated intersec- tion traffic counts that in many cases were not performed on the same day and time. Instead, the process relies on balancing between neighboring intersection counts and other assumptions to create a less-than-optimal picture of the trips on which the engineering analysis depends. The dis- connection (in both time and space) between multiple, separated intersection counting stations remains because there is a discontinuity in the monitoring-once a vehicle completes its movement through an intersection, it gets "lost" from the local survey, and its subsequent movements are not followed.

Another traditional method for obtaining trip data is Origin/Destination (O/D) surveys. In contrast with isolated intersection counts, O/D surveys rely on interviewing people to identify the actual beginning and end of their trips, as well as information on trip mode (e.g., auto, bicycle, transit, etc.), purpose and other variables relevant for planning. The limitation of O/D surveys is that they are significantly expensive to perform, and although they cover the full extent of the trips all the way from origin to destination, they still cover at best a small sample of the total mass of trips on any given day and time. Much like what happens with the balancing of intersection counts, the extrapolation of O/D survey data adds uncertainty to the dataset and compromises the sharpness of the engineering analysis results. In short, it reduces the overall credibility of the study for the intended purpose of transportation planning.

The advent of widespread use of cell phones and on-board GPS brought about another source for trip information, popularly referred to as Big Data. It takes advantage of LBS (location-based signals) from GPS units, fleet management systems and cell phones to detect and log trip information as the trips are being performed. Historic data logs are avail- able for periods of up to 10 years back. Big Data logs can provide a sample of classified turning movement counts and O/D information for all transportation modes, and it can even provide vehicle classification. Big Data limitations are sample size and cost. It only provides information on trips associated with an LBS signal—rarely more than 30% of the total mass of trips—and the cost of the ultimate data is significantly high, such that only big agencies and/or larger budget projects can realistically consider using Big Data surveys to obtain data for transportation planning.

There remains a need in the art for improved processes of collecting vehicular movement data that overcome at least some of the limitations described above, because such data is of prime importance for the processes of urban infrastruc- ture planning and design, as it provides estimates of required road capacity, identifies trip characteristics and informs transportation planning decisions that optimize the invest- ment of public resources.

SUMMARY OF THE INVENTION

Generally, the present invention relates to a broad-sample, sharp (e.g., continuous in time & space) and cost-effective source for traffic volumes and trip data to support the assessment of transportation infrastructure needs. Aspects of the invention employ video camera-equipped, unmanned aerial vehicles (UAVs) to collect video imagery from a predefined study area on the ground, where vehicles are performing trips. The video imagery is then processed using machine vision to extract vehicle trajectory information, which is then organized and manipulated for presentation in a user-facing display when required. In contrast with the state of the art data procurement technologies, the resulting data features continuity in both time and space, reflects 100% of the trips and has a significantly lower cost.

In one aspect, the invention may comprise a process for tracking ground movement, comprising the steps of: simultaneously deploying two or more Unmanned Aerial Vehicles (UAVs) to collect ground traffic video imagery, a first UAV equipped with a first camera that collects ground video imagery from a first polygonal coverage area on the ground during a survey period and a second UAV equipped with a second camera that collects ground video imagery from a second polygonal coverage area during the same survey period, wherein the first and second cameras collect video imagery simultaneously during the survey period and the first and second polygonal coverage areas share an edge; combining the imagery of the first and second cameras to form a continuous ground video imagery mosaic within which the movement of one or more ground vehicles and/or one or more pedestrians can be tracked with continuity in both time and space.

In some embodiments, each polygonal coverage area on the ground may be defined by a portion of the ground that remains visible in the corresponding camera video imagery in spite of the continuous movement of the UAV to which said camera is attached. During the survey period each UAV may fly a circular flight path of reduced radius that is preferably shorter than 50 meters long.

In some embodiments, the imagery collected by each UAV camera has a corresponding ground sampling distance, wherein the UAV flies at higher altitude and said ground sampling distance is kept unchanged by equipping the UAV camera with a telescopic lens that reduces the camera's aperture angle. The imagery collected by each UAV camera has a corresponding ground sampling distance, wherein the UAV flight altitude, the selected camera's video frame resolution and aperture angle are combined to achieve a Ground Sampling Distance preferably no higher than 500 mm/px in the continuous video imagery mosaic.

In some embodiments, the camera in each UAV is mounted on a motorized gimbal that keeps the camera pointed vertically downwards and prevents its rotation in the vertical axis by successive adjustments performed via actuation of the gimbal's motors, regardless of the position and orientation of the UAV during its survey flight.

In some embodiments, the movement of the one or more vehicles and/or one or more pedestrians within the video imagery mosaic is tracked during the survey period using machine vision to track the successive vehicular and/or pedestrian positions within the video imagery frames via pixel differentiation over time.

In some embodiments, the positional reference of a central point of each polygonal coverage area that makes up the video imagery mosaic is used to create trajectory files that document the movement of each individual vehicle and/or pedestrian tracked within the video imagery mosaic as a series of consecutive sets of GPS coordinates, such that vehicle or pedestrian trajectories can be matched to a subjacent street network within the study area.

In some embodiments, the vehicle or pedestrian trajectory files are processed to associate vehicle or pedestrian classification to each vehicle or pedestrian based on its unique trajectory file information.

In some embodiments, the vehicle and/or pedestrian trajectories and/or vehicle and/or pedestrian classifications are processed to a customizable software display user interface, configured to permit a user to select the data that gets presented, such as by manipulation of the vehicle trajectory files.

In some embodiments, variable video imagery distortion resulting from the constant movement of the UAV to which the camera is attached may be attenuated by software corrections timed by the rotational frequency of the UAV's circular flight path.

In some embodiments, the UAV is an untethered, fixed-wing aircraft. Preferably, the first or second camera comprises an array of two or more cameras.

In some embodiments, a plurality of UAVs fly in relays to accommodate any combination of study area size and analysis period.

In another aspect, the invention may comprise a system for tracking ground movement comprising:

(a) a first Unmanned Aerial Vehicle (UAV) equipped with a first camera for collecting ground video imagery from a first polygonal coverage area on the ground during a survey period, and (b) a second UAV equipped with a second camera for collecting ground video imagery from a second polygonal coverage area during the same survey period, and wherein the first and second cameras collect video imagery simultaneously during the survey period and the first and second polygonal coverage areas share an edge.

In another aspect, the invention may comprise a system for tracking ground movement of at least one vehicle and/or pedestrian on the ground, comprising a computer system comprising: a processor and a non-transitory computer readable medium storing instructions that, when executed by the processor, cause the processor to perform a method comprising the steps of:

(a) accessing aerial ground video imagery taken simultaneously above a first polygonal coverage area and a second polygonal coverage area, wherein the first and second polygonal coverage areas share an edge;

(b) combining the ground video imagery of the first and second polygonal coverage areas to form a continuous ground video imagery mosaic; and (c) tracking the movement of the at least one ground vehicle and/or pedestrian within the first and second polygonal coverage areas, with continuity in both time and space.

In some embodiments, the tracking of the movement within said continuous ground video imagery mosaic is performed via pixel differentiation over time.

BRIEF DESCRIPTION OF THE DRAWINGS

In the drawings, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

FIG. 1 is a simplified modular diagram of an embodiment of the process for tracking ground vehicle movement, illustrating its functional outline;

DETAILED DESCRIPTION OF EMBODIMENTS OF THE INVENTION

The present invention provides means to obtain traffic volumes and trip data within a study area and during a survey period that are selected in advance, according to the user needs. Once the study area and survey period are defined, a corresponding flight plan for two or more camera-equipped Unmanned Aerial Vehicles (UAVs) is prepared.

According to the present invention, the UAVs are preferably untethered, fixed-wing aircraft. Such aircraft typically have a natural ability to glide without assistance from the UAV's engine, which increases operational safety in case of engine failure. Each UAV is equipped with an on-board flight controller, which purpose is to store flight profile information that is uploaded by the UAV operator before each flight, and control the UAV operation during the flight. Alternatively other types of UAV can be used, provided that they can deploy the necessary video camera equipment and follow a flight plan that matches the survey requirements.

Figure 2:
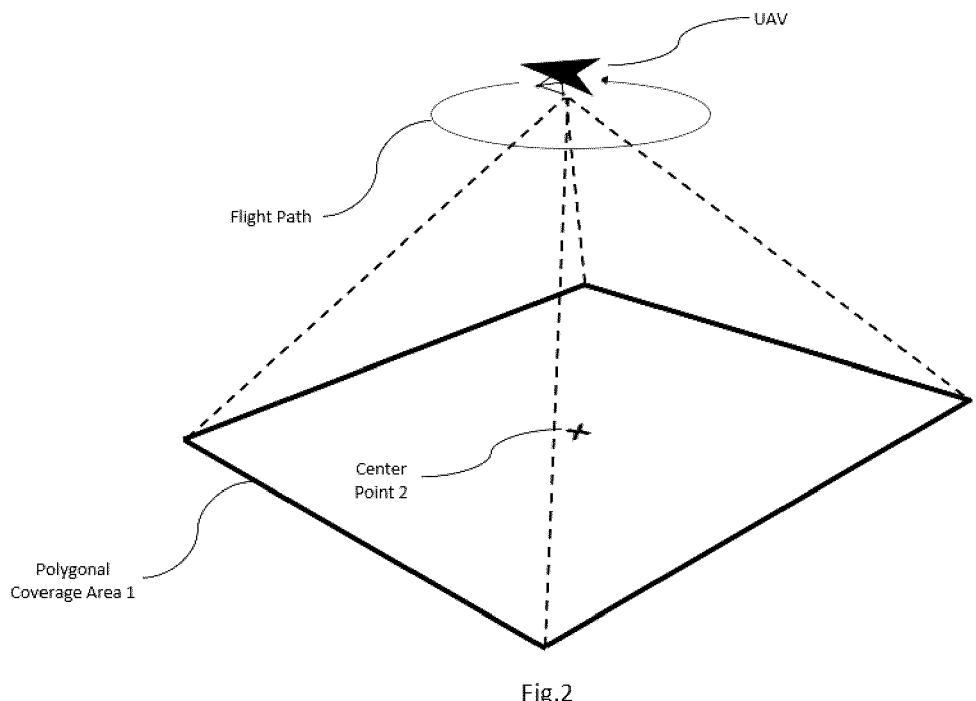
FIG. 2 is an exemplary perspective view illustration of an UAV's polygonal coverage area and UAV flight path.

During the UAV flight, the camera aboard each UAV remains pointed vertically down towards the ground, collecting video imagery within the limits of the camera's field of view. Such field of view is delimited by the camera's aperture angle and the physical format of the camera's image sensor. The camera field of view and the UAV's flight altitude combine to define a coverage area (1) on the ground, as illustrated in FIG. 2. The area is conventionally polygonal, such as rectangular in shape, because so is the typical camera's image sensor. According to the present invention, during the survey period each UAV flies a circular flight path of reduced radius, preferably shorter than about 50 meters long, with the center axis of said circular flight path passing through the GPS coordinates of a point on the ground—designated center point (2)—that lies at the center of the polygonal coverage area (1). The GPS coordinates of this point on the ground correspond to the center point (2), and each UAV camera's polygonal coverage area (1) has its unique corresponding center point (2) on the ground.

As part of the planning for each survey, a properly scaled representation of the mosaic of two or more polygonal coverage areas (1) is laid out over a map of the survey area, allowing identification of the center point (2) corresponding to each of the polygonal coverage areas (1) on the map. In advance of the actual UAV survey flights, ground crew visits the survey area to establish the actual GPS coordinates of the previously mapped center point (2) of each of the two or more polygonal coverage areas (1) that cover the planned survey area. These GPS coordinates are uploaded to the flight controller of each corresponding UAV, which will then have a reference point around which to fly the designated circular flight path with a radius of no more than 50 meters. The desired flight altitude is also uploaded to the flight controller, as it must be kept constant and has a direct correlation to the dimensions of the polygonal coverage area (1) on the ground.

The UAV's flight controller is equipped with its own GPS and altimeter. The on-board GPS allows the controller to continually compare the flight plan's previously uploaded GPS coordinates of the center point (2) to the coordinates of the UAV as it flies, driving any necessary directional adjustments to keep the desired circular flight path with a radius of no more than 50 m around the vertical axis passing through the center point (2) of the polygonal coverage area (1). The UAV's altimeter readings are likewise used by the flight controller to drive any corrections required to keep the UAV's altitude at the value specified in the flight plan. This way, the UAV flight controller continually checks the UAV's flight path and altitude against the instructions contained in the UAV's flight plan, ensuring that the UAV will indeed keep the flight plan's track relative to the centre point (2) regardless of wind action, pressure differentials and any other factors that could potentially misposition the UAV and thus compromise the UAV camera's desired acquisition of video imagery covering the intended polygonal coverage area (1) on the ground as illustrated in FIG. 2.

According to the present invention, the mosaic created by combining the two or more polygonal coverage areas (1) contains the entirety of the study area, such that the study area is visible in its entirety within the limits of the video imagery mosaic.

Figure 3:
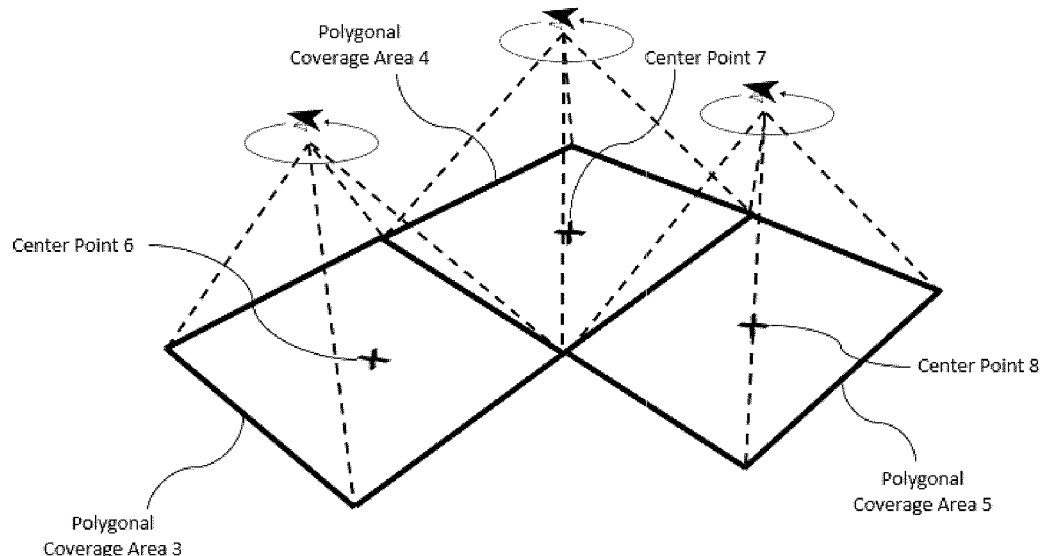
FIG. 3 is an exemplary perspective view of a mosaic of multiple adjacent polygonal coverage areas, where the polygonal coverage area of each UAV camera on the ground shares an edge with at least one adjacent polygonal coverage area of another UAV camera on the ground.

The flight plan of the two or more UAVs addresses the need to provide coverage of the study area with continuity in both time and space. Said time continuity is afforded by flying the two or more UAVs to collect video imagery simultaneously for the duration of the desired survey period, while the space continuity is afforded by creating a mosaic of neighbouring polygonal coverage areas on the ground from multiple UAV cameras. In this mosaic of multiple adjacent polygonal coverage areas on the ground, the polygonal coverage area of each UAV camera on the ground shares an edge with at least one adjacent polygonal coverage area of another UAV camera. An example is illustrated in FIG. 3, where the polygonal coverage areas (3), (4) and (5) each correspond to the camera on a different UAV and have corresponding center points (6), (7) and (8). The number of UAVs—each with its corresponding polygonal coverage area and center point on the ground—can be varied to accommodate different study areas. The relative position of the multiple polygonal coverage areas can likewise vary according to each study area coverage requirements.

So to achieve the desired space and time continuity for the data, the present invention comprises simultaneous deployment of two or more UAVs to collect ground traffic video imagery, each UAV equipped with a camera that collects ground video imagery from one polygonal coverage area on the ground during a survey period, wherein the cameras on the two or more UAVs collect video imagery simultaneously during the survey period and each camera's polygonal coverage area shares an edge with at least one neighboring polygonal coverage area of another camera, with the imagery of the two or more cameras being combined to form a continuous ground video imagery mosaic within which the movement of one or more ground vehicles can be tracked.

According to the flight plan, the UAVs loiter in the air for as long as necessary to capture the full length of the trips performed within the study area during the survey period. The number of UAVs is adjusted according to the requirements for coverage of the desired study area and survey period, including flying relays of UAVs where required. The actual assembly of the video imagery collected by the cameras of the multiple UAVs is performed in a computer on the ground, after the actual flights are completed and the UAVs have landed, allowing the retrieval of the video imagery files from the UAV cameras.

Figure 4:
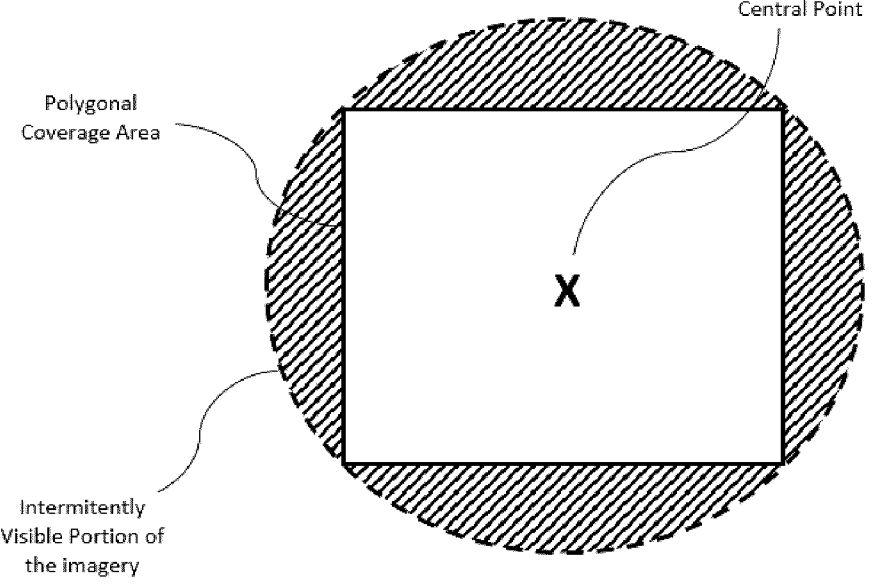
FIG. 4 illustrates in plan view an exemplary effect on the camera imagery resulting from the continuous horizontal movement of the UAV to which the camera is attached.

As stated above, the camera aboard each UAV is pointed vertically down towards the ground, and collects video imagery during the UAV flight. However, the actual ground area covered by the camera imagery changes due to the flight motion of the UAV to which the camera is attached, as illustrated in FIG. 4. Moreover, in addition to the horizontal displacement of the camera, the movement of the UAV in flight (i.e., roll, pitch and yaw) also tends to change to orientation of the camera during the flight, such that a camera rigidly attached to the UAV does not remain pointed vertically down to a fixed point on the ground. The constant changes in the position and orientation of the camera creates difficulty when trying to combine the video imagery collected by the two or more UAV cameras into one continuous mosaic, because some portions of the ground are only intermittently covered by the imagery.

Camera Orientation

Figure 5:
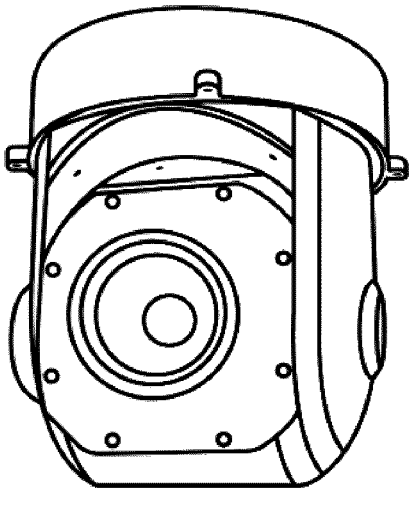
FIG. 5 is an exemplary illustration of a camera gimbal.

According to the present invention, these camera displacement and orientation problems may be solved independently. In some embodiments, the camera is attached to the UAV by means of a gimbal arrangement, of which an example is illustrated in FIG. 5. Said UAV gimbal is connected to the UAV's flight controller, which continually relays to the gimbal information on the UAV's pitch, yaw and roll data. The gimbal is equipped with servo motors that continually change the alignment of the camera via rotation around three orthogonal axes, correcting for the UAV's pitch, yaw and roll movements and thus ensuring that the camera remains pointed vertically down towards the ground and does not rotate around the vertical axis regardless of the displacement and orientation changes of the UAV during flight. So according to some embodiments of the present invention, the camera in each UAV is mounted on a motorized gimbal that keeps the camera pointed vertically downwards and prevents its rotation in the vertical axis by successive adjustments performed via actuation of the gimbal's motors, regardless of the position and orientation of the UAV during its survey flight.

Camera Displacement

The camera displacement problem is such that the ground video imagery ultimately collected features one or more portions that are only intermittently visible, as illustrated in FIG. 4. Therefore, the actual polygonal coverage area (1) on the ground corresponds to only the central portion of the video imagery collected by the UAV camera, whereas the perimeter portions—which are only intermittently visible due to the UAV's circular displacement—are cropped-out (i.e., subtracted) from the original camera imagery file. In other words, each polygonal coverage area (1) on the ground is defined by the portion of the ground that remains visible in the corresponding camera imagery in spite of the continuous movement of the UAV to which said camera is attached.

Vehicle Obstruction

Figure 6:
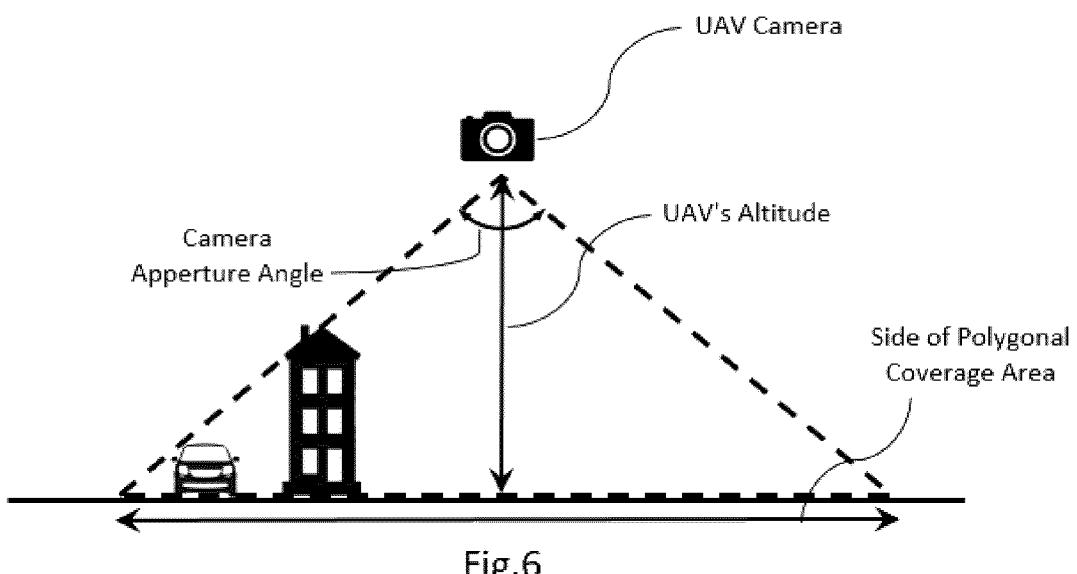
FIG. 6 is an exemplary side view illustration of the potential issue of sightline obstruction by buildings identifying the camera aperture angle, UAV altitude and ground sampling distance (GSD)
Figure 7:
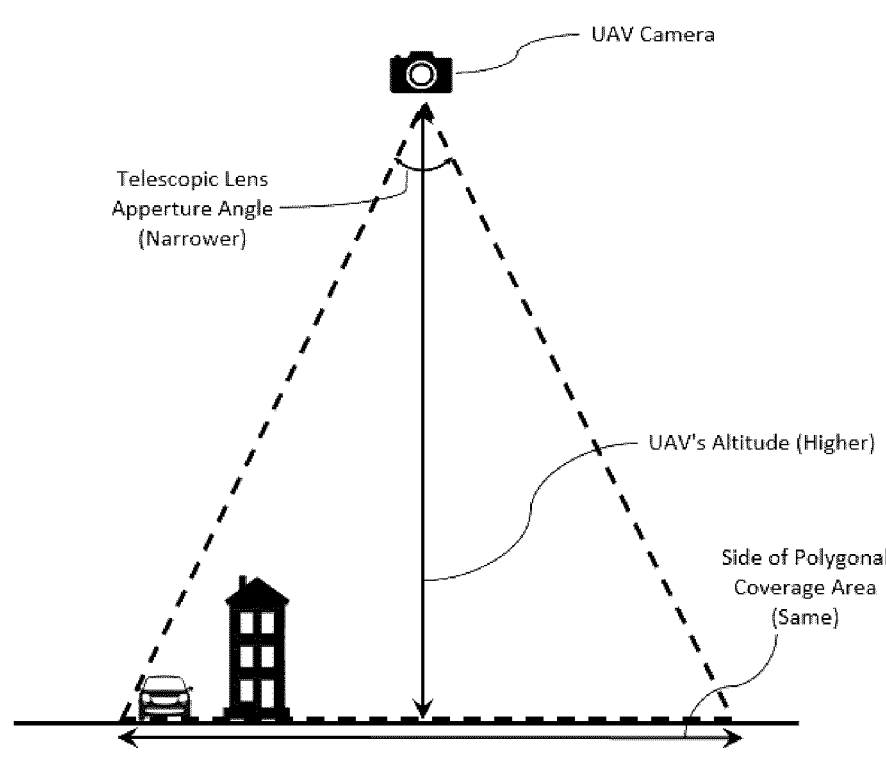
FIG. 7 is an exemplary side view illustration similar to FIG. 6, where the camera is equipped with a telescopic lens, which combined with higher flying altitudes can mitigate the sightline obstruction issues.

The combination of the UAV camera aperture and the presence of buildings on the ground creates potential for sightline obstructions, such as a building obstructing the camera's view of a car in a street near said building, as illustrated in FIG. 6. The problem is more prominent in areas where high-rising buildings are present, as well as areas where roadway surfaces sit nearer building facades. UAV camera sightline obstructions can potentially render intermittently invisible the very vehicles that the present invention aims to track. According to the present invention, such potential sightline obstruction issues are mitigated by the use of telescopic lenses on the UAV cameras. The telescopic lens allows the same polygonal coverage area (1) on the ground to be covered by the same UAV camera while the UAV flies at a higher altitude, reducing the UAV camera aperture angle and thus proportionately reducing the sightline obstruction issue, as illustrated in FIG. 7. The narrower the UAV camera aperture angle, the closer to the vertical becomes the line of sight from the camera to the ground, minimizing the problem of sightline obstruction of vehicles by buildings.

Those skilled in the art are familiar with the concept of ground sampling distance (GSD) as applied to imagery, which is the distance between two consecutive pixel centers of said imagery, as measured on the ground. The bigger the value of the imagery GSD, the lower is the spatial resolution of the image and the less visible are the imagery details. GSD is typically measured in millimeters per pixel (mm/px). Comparison between FIG. 6 and FIG. 7 illustrates an important aspect of the present invention: Although the UAV of FIG. 7 is flying farther away from the ground than the UAV of FIG. 6, the dimensions of the polygonal coverage area (1) on the ground remain the same, so that the ground sampling distance (GSD) remains the same as well. The UAV flies at higher altitude and the ground sampling distance is kept unchanged by equipping the UAV camera with a telescopic lens that reduces the camera's aperture angle, minimizing the sightline obstruction problem. According to the present invention, the GSD is also considered upon defining the flight plan, as it has an impact on the ability to properly track vehicular movements across the mosaic of video imagery files obtained from the two or more UAV cameras.

A higher space resolution on the imagery obtained with the UAV camera makes the tracking of moving vehicles within said imagery more reliable, because the vehicle's shape and position can be detected in the imagery with higher precision. According to the present invention, the UAV flight altitude, the selected camera's video frame resolution and aperture angle are combined to achieve a Ground Sampling Distance no higher than 500 mm/px in the continuous video imagery mosaic, so as to enable reliable vehicle tracking within the video imagery mosaic.

Imagery Processing

Once the two or more UAVs assigned to fly the flight plan have completed their surveys and landed, the video imagery files are downloaded or otherwise transferred from the UAV cameras onto a computer for processing, and are assembled into a continuous video imagery mosaic on the basis of the GPS coordinates of the central point (2) on the ground for each of the UAV camera imagery files. The study area is visible in its entirety within the limits of the video imagery mosaic during the survey period. Once the video imagery mosaic is assembled in the computer, it no longer matters that the two or more video imagery files that were assembled together originally came from different cameras.

For the purpose of tracking the movement of vehicles across the assembled video imagery mosaic, all portions of the referred video imagery mosaic are recorded simultaneously and there is no coverage gap separating neighboring imagery from the two or more UAV camera outputs.

According to the present invention, the movement of vehicles within the video imagery mosaic is tracked during the survey period with the aid of a tracking software application that relies on machine vision to track the successive vehicular positions within the video imagery frames via pixel differentiation over time.

The aforementioned tracking process yields a series of coordinates and associated timestamps that are denominated vehicle trajectory files, which basically translate each vehicular trip into a series of positional coordinates at regular time intervals. According to the present invention, the positional reference of the central point (2) of each polygonal coverage area (1) that makes up the video imagery mosaic is used to create trajectory files that document the movement of each individual vehicle tracked within the video imagery mosaic as a series of consecutive sets of GPS coordinates, such that vehicle trajectories can be matched to a subjacent street network within the study area.

The vehicle trajectory files and coordinates of the subjacent street network are passed on to a classification software application that associates vehicle classification to each individual vehicle based on its unique trajectory file information. Extensive analytic algorithms may ensure correct vehicle classification based on vehicle speed, acceleration, geocoded location, movement patterns, and imagery timestamps.

The outputs of the tracking and classification software applications are input to a customizable software display user interface that allows the user to select the data that gets presented via manipulation of the vehicle trajectory files. The display user interface depicts the study area road network and a selection of trip data information based on user requests, such as classified turning movement counts at intersections, total origin/destination trip volumes between two selected zones within the study area and other data aggregation patterns that are standard in the transportation planning analyses industry. If desired, the display user interface may depict such vehicular movements onto an open-source road map in the interface display.

In alternative embodiments, the UAV camera is replaced by an array of two or more cameras. Also alternatively, the detection includes not only ground vehicles, but also pedestrian movements and movements of personal transportation devices such as bicycles or scooters, allowing for the tracking and analysis of those trips as well.

Implementation System

An exemplary system for tracking ground movement according to the present invention would comprise a first Unmanned Aerial Vehicle (UAV) equipped with a first camera for collecting ground video imagery from a first polygonal coverage area on the ground during a survey period, and a second UAV equipped with a second camera for collecting ground video imagery from a second polygonal coverage area during the same survey period. The first and second cameras would collect video imagery simultaneously during the survey period and the first and second polygonal coverage areas would share an edge. The ground video imagery of the first and second cameras may then be extracted from the cameras and made available to a computer system equipped with a processor and a non-transitory computer readable medium storing instructions that, when executed by the processor, cause the processor to implement algorithms to access the ground video imagery of the first and second cameras and combine them to form a continuous ground video imagery mosaic. A machine vision software would access the continuous ground video imagery mosaic and track the movement of one or more ground vehicles and/or one or more pedestrians, with continuity in both time and space within said continuous ground video imagery mosaic via pixel differentiation over time. The tracking process would yield trajectory files for each individual vehicle and/or pedestrian detected within the continuous ground video imagery mosaic, based on vehicle and/or pedestrian coordinates and timestamps. The vehicle and/or pedestrian coordinates would be obtained from the positional reference of a first central point of the polygonal area from the first camera in the first UAV and a second central point of the polygonal area from the second camera in the second UAV, identified as a series of consecutive sets of GPS coordinates taken from a GPS unit aboard each UAV. The timestamps associated with the various positions of the tracked vehicle and/or pedestrian would be obtained from the original ground video imagery of the first and second cameras, as the cameras would timestamp the imagery files as they are collecting the imagery. The vehicle and/or pedestrian trajectories would be matched to a subjacent street network within the study area based on GPS coordinates. The vehicle trajectory files would be then processed to associate vehicle classification to each vehicle and/or pedestrian based on its unique trajectory file information. The vehicle trajectories and vehicle classifications would then be processed to a customizable software display user interface, configured to permit a user to select the data that gets presented, such as by manipulation of the vehicle trajectory files.

Interpretation

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A process for tracking ground movement, comprising the steps of: simultaneously deploying two or more Unmanned Aerial Vehicles (UAVs) to collect ground traffic video imagery, a first UAV equipped with a first camera that collects ground video imagery from a first polygonal coverage area on the ground during a survey period and a second UAV equipped with a second camera that collects ground video imagery from a second polygonal coverage area during the same survey period, wherein the first and second cameras collect video imagery simultaneously during the survey period and the first and second polygonal coverage areas share an edge; combining the imagery of the first and second cameras to form a continuous ground video imagery mosaic within which the movement of one or more ground vehicles and/or one or more pedestrians can be tracked with continuity in both time and space.

2. The process according to claim 1 wherein each polygonal coverage area on the ground is defined by a portion of the ground that remains visible in the corresponding camera video imagery in spite of the continuous movement of the UAV to which said camera is attached.

3. The process according to claim 2, wherein variable video imagery distortion resulting from the constant movement of the UAV to which the camera is attached is attenuated by software corrections timed by the rotational frequency of the UAV's circular flight path.

4. The process according to claim 1, wherein during the survey period each UAV flies a circular flight path of reduced radius that is preferably shorter than 50 meters long.

5. The process according to claim 1, where the imagery collected by each UAV camera has a corresponding ground sampling distance, wherein the UAV flies at higher altitude and said ground sampling distance is kept unchanged by equipping the UAV camera with a telescopic lens that reduces the camera's aperture angle.

6. The process according to claim 1, where the imagery collected by each UAV camera has a corresponding ground sampling distance, wherein the UAV flight altitude, the selected camera's video frame resolution and aperture angle are combined to achieve a Ground Sampling Distance no higher than 500 mm/px in the continuous video imagery mosaic.

7. The process according to claim 1, wherein the camera in each UAV is mounted on a motorized gimbal that keeps the camera pointed vertically downwards and prevents its rotation in the vertical axis by successive adjustments performed via actuation of the gimbal's motors, regardless of the position and orientation of the UAV during its survey flight.

8. The process according to claim 1, wherein the movement of the one or more vehicles and/or pedestrians within the video imagery mosaic is tracked during the survey period using machine vision to track the successive vehicular and/or pedestrian positions within the video imagery frames via pixel differentiation over time.

9. The process according to claim 1, wherein the positional reference of a central point of each polygonal coverage area that makes up the video imagery mosaic is used to create trajectory files that document the movement of each individual vehicle and/or pedestrian tracked within the video imagery mosaic as a series of consecutive sets of GPS coordinates, such that vehicle and/or pedestrian trajectories can be matched to a subjacent street network within a study area.

10. The process according to claim 9, wherein the vehicle and/or pedestrian trajectory files are processed to associate vehicle classification to each vehicle and/or pedestrian based on its unique trajectory file information.

11. The process according to claim 10, wherein the vehicle and/or pedestrian trajectories and vehicle and/or pedestrian classifications are processed to a customizable software display user interface, configured to permit a user to select the data that gets presented, such as by manipulation of the vehicle trajectory files.

12. The process according to claim 1, wherein the UAV is an untethered, fixed-wing aircraft.

13. The process according to claim 1, wherein the first or second camera comprises an array of two or more cameras.

14. The process according to claim 1, wherein a plurality of UAVs fly in relays to accommodate any combination of study area size and analysis period.

15. A system for tracking ground movement of at least one vehicle and/or pedestrian on the ground, comprising a computer system comprising: a processor and a non-transitory computer readable medium storing instructions that, when executed by the processor, cause the processor to perform a method comprising the steps of:

a. accessing aerial ground video imagery taken simultaneously above a first polygonal coverage area and a second polygonal coverage area, wherein the first and second polygonal coverage areas share an edge;

b. combining the ground video imagery of the first and second polygonal coverage areas to form a continuous ground video imagery mosaic; and c. tracking the movement of the at least one ground vehicle and/or pedestrian within the first and second polygonal coverage areas, with continuity in both time and space.

16. The system according to claim 15 wherein the tracking of the movement within said continuous ground video imagery mosaic is performed via pixel differentiation over time.

* * * * *